Aug. 27, 1974  A. HIRZ ET AL  3,832,360
PROCESS FOR THE CONTINUOUS PREPARATION OF
TRIMELLITIC ACID ANHYDRIDE
Filed June 18, 1970
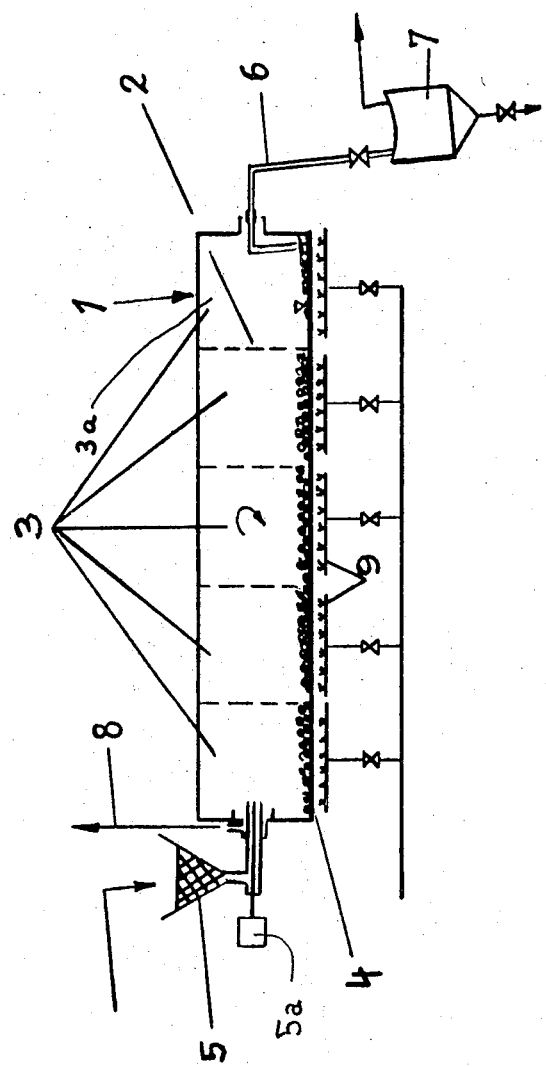
INVENTORS.
ALBERT HIRZ
KURT HANDRICK
GEORG KÖLLING
By Allin C. Collard
Attorney 3,832,360
PROCESS FOR THE CONTINUOUS PREPARATION OF TRIMELLITIC ACID ANHYDRIDE
Albert Hirz, Kurt Handrick, and Georg Kölling, Essen, Germany, assignors to Bergwerksverband GmbH, Essen-Kray, Germany
Filed June 18, 1970, Ser. No. 47,459
Claims priority, application Germany, June 19, 1969, P 19 30 934.3
Int. Cl. C07c 63/32
U.S. Cl. 260—346.3
3 Claims

ABSTRACT OF THE DISCLOSURE

A process for the continuous preparation of trimellitic acid anhydride by thermal dehydration of the acid at temperature in the range of about 210–260° C., which comprises passing trimellitic acid through an inclined rotating kiln having a plurality of compartments formed by vertical partitions, all compartments with the exception of the one at the discharge end being filled to about one-fifth to one-thirtieth of their volume by a plurality of balls. The invention also relates to an apparatus for carrying out the process.

---

This invention relates to a process and an apparatus for the continuous preparation of trimellitic acid anhydride.

It is known that crude trimellitic anhydride can be prepared by heating trimellitic acid at temperatures of about 210–260° C., until the splitting off of water is complete.

It is customary to carry out the process discontinuously in containers, vessels or ovens. The trimellitic acid is filled in, melted and withdrawn in charges after formation of the crude anhydride. This is explained in British Pat. No. 907,926.

A continuous process has also been proposed in which trimellitic acid is passed over a system of agitated vessels arranged in cascade form, wherein an ever increasing amount of liquid anhydride is present at the reaction temperature. It is a disadvantage of this process that due to the limited surface of the vessels, heat can only be introduced gradually into the melt. Only a slight improvement of heat transmission can be brought about by stirrers, a fact which becomes evident after the apparatus has been standing, and its operation is to be resumed. At any event, it is necessary to keep the trimellitic acid in the apparatus for a long time. This leads to losses in the output, because due to additional splitting off of one molecule of water between two anhydride molecules, an undesirable intermolecular anhydride is formed.

Another known process is the thermal dehydration of trimellitic acid in the presence of high-boiling solvents. In that process, the steam which is set free is stripped with a portion of the evaporated solvent, which acts as carrier. After condensation and separation from water, the solvent is returned into the process as shown in U.S. Pat. No. 2,971,011. The water can be split off in that process at temperatures lower than 210–260° C., but the reaction time is correspondingly longer. Another disadvantage is that a continuous operation is not possible, and the separation of the carrier from the anhydride requires an additional distillation.

In the present invention, trimellitic acid is passed through an inclined rotating kiln which is subdivided into at least three compartments by partitions having appropriately sized apertures, and arranged substantially normally with respect to the axis of the kiln. All compartments, with the exception of the one at the discharge end of the kiln, are filled with balls taking up from about one-fifth to one-thirtieth of the volume of the compartments. In this manner, it is possible to convert the trimellitic acid into the anhydride in a shorter time than by methods hitherto in use, without incurring decomposition or undesirable side reactions. This is due to the fact that the entire surface of the inner wall of the kiln is at all times covered by a thin film of molten trimellitic anhydride which remains present during the rotation of the kiln on the heated wall. The rolling balls in the interior of the kiln distribute the trimellitic acid evenly in the compartments and improve the heat exchange.

The diameter of the balls should be about one-tenth to one-twenty-fifth of the internal diameter of the kiln.

In carrying out the process of the invention, the residence time of the trimellitic acid in the kiln is about 10–60 minutes. This time can be maintained at a constant rate when, according to a further feature of the invention, the amount of trimellitic acid added is controlled and the volume of the filling regulated by adjustment of the discharge tube. The molten anhydride is preferably withdrawn by way of an evacuated chamber.

The trimellitic acid can be fed into the kiln either in dry or moist state. In the latter case, the drying, melting, dehydration and separation of the water formed are all effected in a single apparatus. Entraining means or other additives are not necessary.

It is therefore an object of the present invention to provide an improved process for the preparation of crude trimellitic acid anhydride, which is simple, can be carried out under easy operating conditions and in a continuous manner.

It is also an object to provide an apparatus for carrying out the process.

Other objects and features of the invention will be apparent from the following detailed description in connection with the accompanying drawing which shows the embodiments of the invention. It is to be understood, however, that the drawing is designed for the purpose of illustration only and not as a definition of the limits of the invention.

The accompanying drawing shows a kiln according to the invention which is schematically illustrated.

A rotary kiln 1 in which a number of perforated partitions 2 are provided which subdivide the tube of the kiln into compartments 3. Each compartment contains a filling of ball-shaped elements 4 which take up from about one-fifth to one-thirtieth of the volume. A feed-in device comprising a funnel 5 and a measuring conveyor 5a serve to introduce trimellitic acid into the kiln, for instance, in dry state. The last compartment at the discharge end of the kiln is designated by 3a. It serves as collecting zone for the crude anhydride formed in the process and has no ball filling. A discharge tube 6 is adjustably mounted in compartment 3a which is capable of maintaining the volume of molten crude anhydride at a constant level. Discharge of the crude anhydride is effected by means of a vacuum chamber 7 arranged in series with the kiln.

Water formed during the dehydration process escapes in vapor form through pipe line 8. To heat the kiln, burners 9 are provided which may be operated by gas or oil. Heating may also be provided by electric means.

The trimellitic acid is fed continuously to the kiln and discharge of the trimellitic anhydride and of water likewise occurs continuously.

As the balls move about and are thrust against each other, they are freed of adherent viscous and plastic substances. Such a cleaning action is necessary, because the product passes, during the melting, through a pasty phase which could easily lead to deposit formation and clogging. The melt takes up the space between the wall of the kiln and the gaps between the balls and is there uniformly heated from all sides so that it will pass into the melt, which is continuously conveyed to the lower-placed last chamber.

Purification of the crude trimellitic anhydride can be brought about by distillation in a conventional manner.

In the following, two examples are given explaining the process of the invention, but it should be understood that they are only submitted by way of illustration and not of limitation. Many changes in the details can be made without departing from the spirit of the invention.

EXAMPLE 1

Into a kiln designed in the manner of the drawing having an inner diameter of 250 mm. and a length of 1.2 m., technical grade trimellitic acid with an acid number 792 is introduced at the rate of 3.5 kg. per hour; dehydration is effected at a temperature of 240° C. Crude trimellitic anhydride with an acid number of 862 (theoretical number 876) is obtained with a yield of 99.5% of the theoretical.

By distillation of a specimen (boiling point 199° C. at 1 Torr=1 mm. Hg) trimellitic anhydride is obtained having an acid number=873 and a distillation residue of 4% by weight of the amount used for distillation.

For purposes of comparison, 3.5 kg. trimellitic acid of the same quality were introduced into a round-bottomed flask equipped with stirrer and rising tube, which is placed into an oil bath heated to 240° C. and which already contains 2 kg. of crude trimellitic anhydride; admission of the acid should be so controlled that a stirring effect by the stirring device is guaranteed. The rising tube surrounded by a heating jacket is maintained at 100° C. for the escape of the steam. The splitting off of water ceases only after 2.5 hours. The product, obtained in a yield of 99.1% of the theoretical, has an acid number of 858. A specimen distillation leads to a trimellitic anhydride having an acid number of 870 and a distillation residue of 7.5% by weight.

EXAMPLE 2

In the same apparatus as described above, 3.6 kg. of technical trimellitic acid having an acid number of 792 and a moisture content of 25% by weight—the acid arriving in a moist state from centrifuging, are dehydrated at a temperature of 240° C. The yield in trimellitic anhydride is 99.3% of the theoretical; the product has an acid number of 860.

What is claimed is:

1. A process for the continuous preparation of crude trimellitic acid anhydride by thermal dehydration of trimellitic acid which comprises feeding trimellitic acid into an inclined rotary kiln having at least three compartments formed by perforated partitions extending substantially normal to the kiln axis, all compartments, with the exception of the last at the discharge end, being filled by a plurality of balls to about one-fifth to one-thirtieth of the volume of each compartment, said balls having a diameter between about one-tenth and about one-twenty-fifth of the internal diameter of the kiln and being sufficient in number to provide effective heat exchange in the interior of the kiln, said perforations in said partitions being of sufficient number and diameter to permit passage of viscous molten trimellitic acid or anhydride but not the passage of said balls therethrough, while maintaining the temperature within the kiln at about 210–260° C., continuously effecting melting of the trimellitic acid to form a reaction mass incorporating molten trimellitic acid anhydride and passing said mass successively through said compartments, continuously removing formed water of decomposition from the kiln, said molten reaction mass filling the space between the inner wall of the kiln and the gaps between the balls but without substantial adherence to the balls, the volume of molten material being maintained at a substantially constant level, to effect at least about 99% conversion to said anhydride within a total residence time of about 10–60 minutes, collecting the molten formed anhydride in a collecting zone formed by said last compartment and withdrawing the molten anhydride product from said last compartment.

2. The process according to claim 1 wherein the regulation of the residence time is effected by control of the amount of trimellitic acid added to the reaction mass and by automatic adjustment of the desired amount of said mass withdrawn from said last compartment.

3. The process according to claim 1, wherein the anhydride product is withdrawn from the kiln by way of a vacuum zone.

References Cited

UNITED STATES PATENTS

| 2,971,011 | 2/1961 | Liao et al. | 260—346.3 |
| 2,020,506 | 11/1935 | Jewett | 23—279 |

FOREIGN PATENTS 907,926  10/1962  Great Britain.

HENRY R. JILES, Primary Examiner

B. DENTZ, Assistant Examiner

U.S. Cl. X.R.

23—279